United States Patent [19]

Aso

[11] Patent Number: 5,497,446

[45] Date of Patent: Mar. 5, 1996

[54] SPEECH INFORMATION PROCESSING METHOD AND APPARATUS CONNECTABLE TO A PUBLIC LINE

[75] Inventor: Takashi Aso, Tama, Japan

[73] Assignee: Canon Kabushiki Kaisha, Tokyo, Japan

[21] Appl. No.: 174,172

[22] Filed: Dec. 29, 1993

Related U.S. Application Data

[63] Continuation of Ser. No. 884,458, May 14, 1992, abandoned, which is a continuation of Ser. No. 562,443, Aug. 2, 1990, abandoned, which is a continuation of Ser. No. 211,542, Jun. 24, 1988, abandoned.

[30] Foreign Application Priority Data

Jun. 26, 1987 [JP] Japan ................... 62-157625

[51] Int. Cl.⁶ ..................................... G10L 9/00
[52] U.S. Cl. ............................................. 395/2.1; 395/2.4
[58] Field of Search ......................... 381/41–53; 395/2.4, 395/2.55, 2.6, 2.79, 2.84, 2–2.1

[56] References Cited

U.S. PATENT DOCUMENTS 3,896,266  7/1975  Waterbury .................................. 381/42
4,053,710  10/1977  Advani ...................................... 381/42

*Primary Examiner*—Allen R. MacDonald
*Assistant Examiner*—Michelle Doerrler
*Attorney, Agent, or Firm*—Fitzpatrick, Cella, Harper & Scinto

[57] ABSTRACT

An apparatus for positively recognizing speech generated by a large, unspecified number of speakers performs optimal speech recognition processing on the basis of speech information dictionaries corresponding to the respective speakers by consecutively inputting and preparing in advance speech information dictionaries corresponding to the respective speakers.

14 Claims, 5 Drawing Sheets

SPEECH INFORMATION PROCESSING METHOD AND APPARATUS CONNECTABLE TO A PUBLIC LINE

This application is a continuation of application Ser. No. 07/884,458 filed May 14, 1992, now abandoned, which is a continuation of application Ser. No. 07/562,443 filed Aug. 2, 1990, now abandoned, which is a continuation of application Ser. No. 07/211,542 filed Jun. 24, 1988, now abandoned.

BACKGROUND OF THE INVENTION

1. Field of the Invention

The present invention relates to a speech information processing apparatus for speech recognition.

2. Related Background Art

Speech recognition systems for identifying speech input from a telephone set are generally known. In many of these systems, characteristics extracted from a speaker's words or the characteristics of the spoken words themselves are registered in a memory as parameters, and a speech recognition circuit compares the characteristic pattern stored in the memory with the speech (words) of the speaker transmitted from the telephone set, and extracts words displaying the characteristic pattern of speech which is identical with the speech (words) of the speaker.

However, when a number of people make use of such a system, it is necessary to register the voice of each speaker in the speech recognition circuit. This involves the disadvantage that if the number of speakers to be registered increases, the capacity of the memory for storing each speaker's voice must be made disadvantageously large in correspondence with this increase.

Speech recognition circuits for use with respect to unspecified speakers have also been conceived, but the present situation in these systems is such that the success rate of speech recognition is still low, so that they have not yet been put into practical use.

SUMMARY OF THE INVENTION

Accordingly, a primary object of the present invention is to provide a speech information processing apparatus which is capable of positively recognizing the speech of a majority of unspecified speakers, thereby overcoming the above-described drawbacks of the prior art.

Another object of the present invention is to provide a speech information processing apparatus which is arranged such that each person using the speech information processing apparatus is provided with a card in which information on his or her speech is recorded in advance, each person inserts the card in the apparatus before use, and the information is then read by the apparatus, and which is capable of performing speech recognition efficiently on the basis of a user dictionary adapted to allow recognition of the speaker's words, the dictionary being prepared before the user speaks.

Still another object of the present invention is to provide a speech information processing apparatus in which, before performing the identification of a first item of speech information, a second item of speech information used for that identification is read, as required, and the second item of speech information can always be used as an optimum dictionary in the process of speech recognition.

According to one aspect of the invention there is provided a speech information processing apparatus which comprises speech input receiving means, reading means and speech information transmission means. The speech input receiving means is arranged to receive a first item of speech information. The reading means is arranged to read, from a recording medium, a prerecorded second item of speech information for use in recognizing the first item of speech information. The speech information transmission means is connectable between the receiving means, the reading means and a speech recognition device for transmitting both the second item of speech information read by the reading means and the first item of speech information received by the receiving means to the speech recognition device.

According to a second aspect of the invention there is provided a speech information processing apparatus which comprises reception means, storage means and speech recognition means. The reception means is arranged to receive both a first item of speech information to be recognized and a second item of speech information to be used in recognizing the first item of speech information. The storage means is connectable to the reception means and is arranged to store the second item of speech information received by the reception means. The speech recognition means is connectable to the reception means and the storage means for effecting speech recognition of the first item of speech information received by the reception means according to the second item of speech information stored in the storage means.

According to a third aspect of the invention there is provided a speech information processing apparatus which comprises an optical card, reading means, speech input receiving means, storage means and speech recognition means. The optical card has a characteristic pattern of speech recorded therein. The reading means is arranged to read the characteristic pattern of speech recorded in the optical card. The speech input receiving means is arranged to receive speech information. The storage means is connectable to the reading means for storing the characteristic pattern of speech read by the reading means. The speech recognition means is connectable to both the speech input receiving means and the storage means for effecting speech recognition from speech information received by the speech input receiving means according to the characteristic pattern of speech stored in the storage means.

According to further aspects of the invention there are provided novel methods of speech information processing which involve the steps performed by each of the above described apparatus.

These and other objects, features and advantages of the present invention will become more apparent from the following description of the present invention when read in conjunction with the accompanying drawings.

DETAILED DESCRIPTION OF THE PREFERRED EMBODIMENT

Referring now to the accompanying drawings, a description will be made of an embodiment of the present invention. It should be noted that the function of the present invention may be attained by a single apparatus or a system comprising a plurality of apparatuses. In addition, it goes without saying that the function of the present invention may be attained through a communication line.

Figure 1:
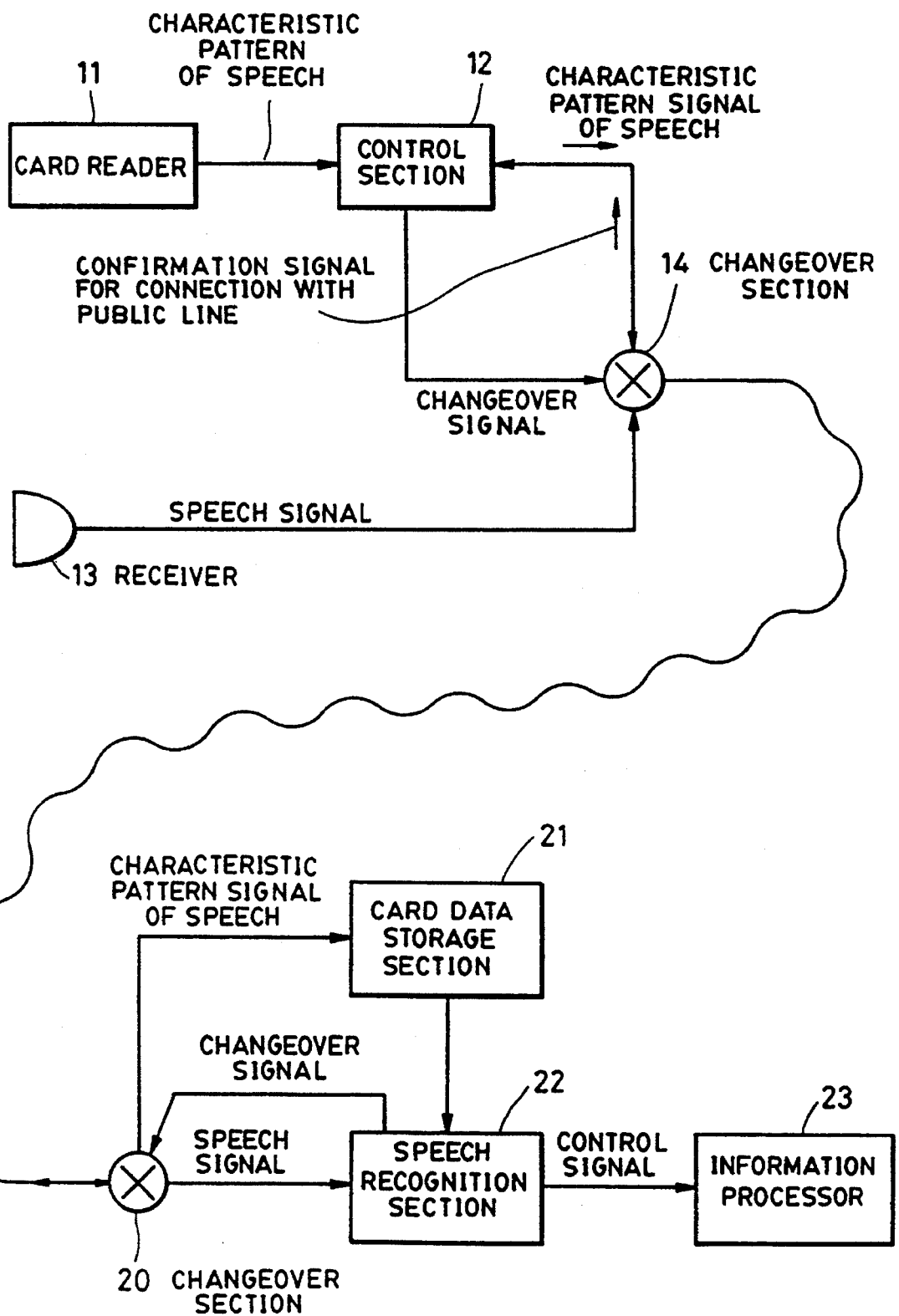
FIG. 1 is a block diagram illustrating an example of a system configuration in accordance with an embodiment of the present invention.

FIG. 1 illustrates an example of a configuration in accordance with an embodiment of the present invention.

In FIG. 1 is shown a card reader 11 which may be of a generally known type which is adapted to read such cards as magnetic cards or optical cards. This card reader 11 is adapted to read a characteristic pattern of speech as a second item of speech information which has been written in the card in advance. Speech information corresponding to a predetermined row of characters which are used as a characteristic pattern of speech is recorded in the aforementioned card in advance. A control section 12 effects control in such a manner as to output to a public line the characteristic pattern of speech read by the card reader 11. Incidentally, it is possible to adopt as the aforementioned card reader 11 or as an apparatus (not shown) for writing speech information one of the type disclosed in U.S. patent application Ser. No. 936,599 filed Dec. 1, 1986, now U.S. Pat. No. 4,831,243, issued May 16, 1989.

A receiver 13 inputs and outputs speech as a first item of speech information, while a changeover section 14 is adapted to selectively change over to a public line between the characteristic pattern of speech read by the card reader 11 and speech information transmitted and received by a receiver.

A changeover section 20 changes over information coming in from the public line to a card data storage section 21 or a speech recognition section 22 depending on the type of incoming information. The card data storage section 21 stores the characteristic pattern of speech.

The speech recognition section 22 recognizes the meaning of the speech information sent from the receiver 13, on the basis of the characteristic pattern of speech. As for this characteristic pattern of speech, one stored in the card data storage section 21 is used.

An information processor 23 or a similar electronic apparatus performs processing in correspondence with the contents of a message recognized by the speech recognition section 22.

Prior to describing the operation, specific examples of configurations will be described with respect to the control section 12, the card data storage section 21, and the speech recognition section 22 in such an arrangement.

Figure 2:
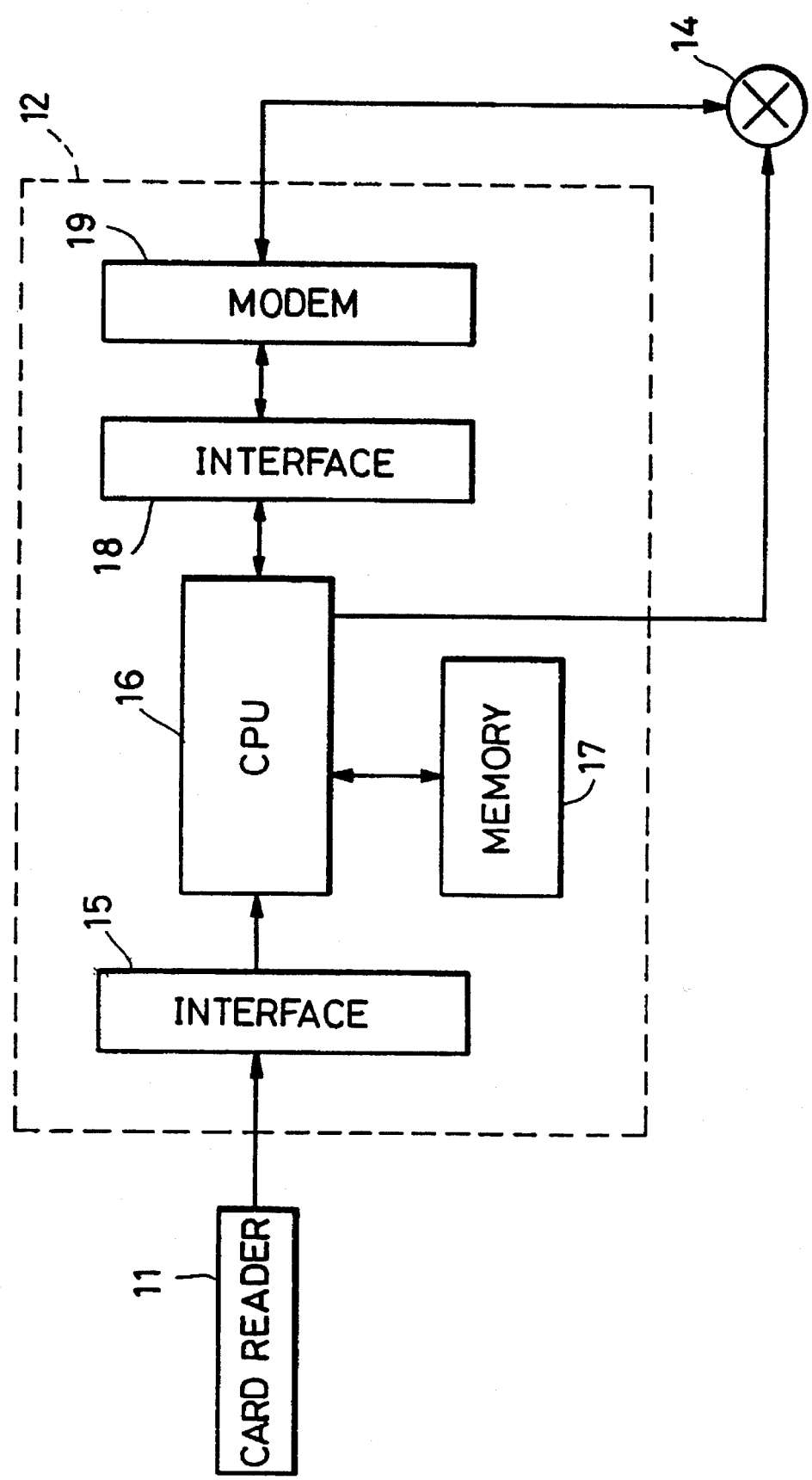
FIG. 2 is a block diagram illustrating an example of a configuration of a control section 12 of the embodiment of the present invention.

FIG. 2 illustrates an example of a configuration of the control section 12 in accordance with the embodiment of the present invention.

In FIG. 2, an interface 15 transfers to a central processing unit (CPU) 16 a signal representing the characteristic pattern of speech read by the card reader 11. The CPU 16 executes a control procedure relating to the present invention and shown in FIG. 4. A memory 17 stores the control procedure shown in FIG. 4 and a control procedure for transferring information to the public line. An interface 18 is connected between the CPU 16 and a modem 19 and transfers information from the CPU to the modem as well as from the modem to the CPU.

The modem 19 includes both an analog-digital (A/D) converter and a digital-analog (D/A) converter. The signal processed by the CPU 16 is a digital signal. Therefore, since the signal transmitted by the public line is an analog signal, the signal is subjected to A/D conversion or D/A conversion by the modem 19 in correspondence with an input or output of the signal.

Figure 3:
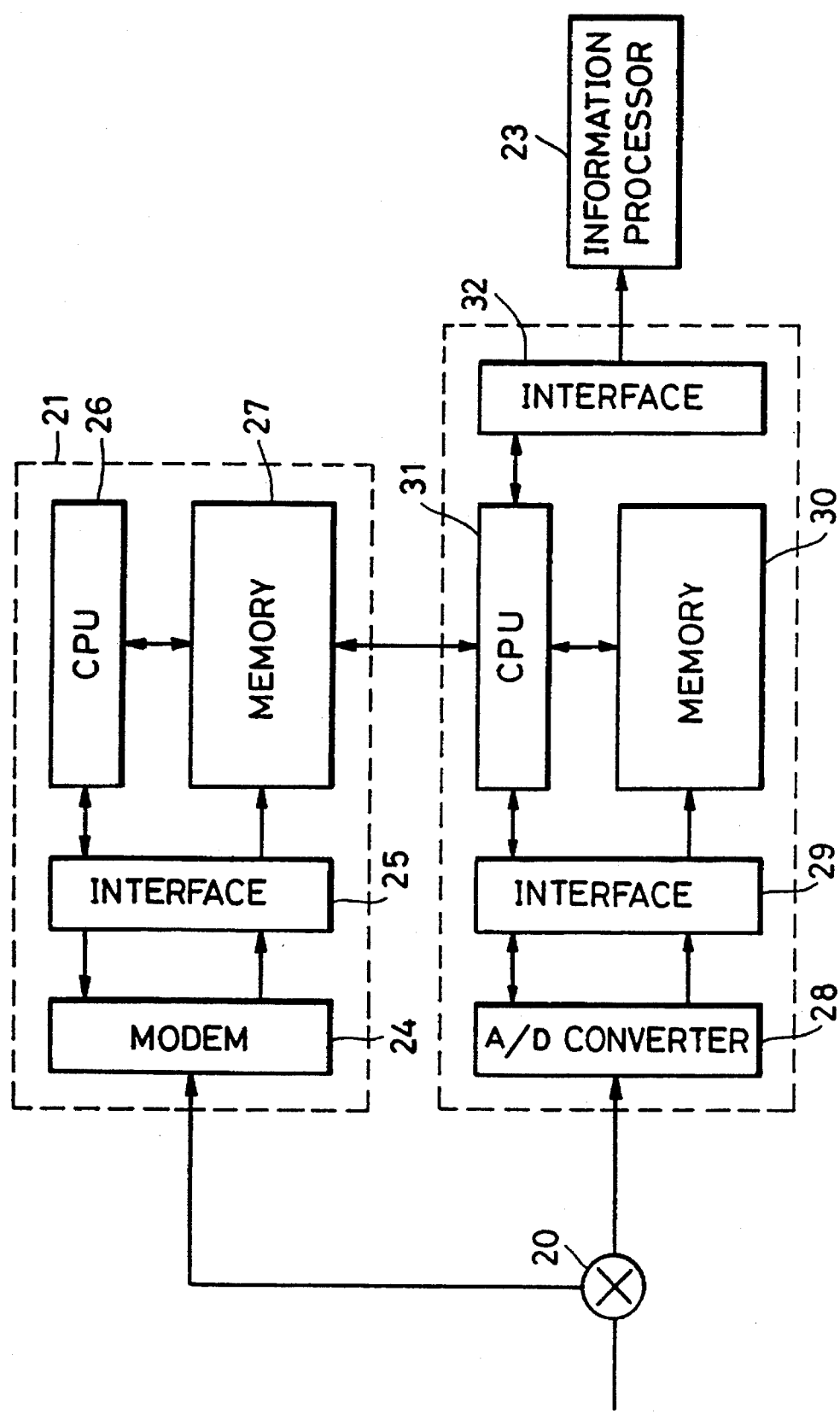
FIG. 3 is a block diagram illustrating examples of configurations of a card data storage section 21 and a speech recognition section 22 in accordance with the embodiment of the present invention.

FIG. 3 illustrates examples of configurations of the card data storage section 21 and the speech recognition section 22.

In FIG. 3, reference numeral 24 denotes a modem, while numeral 25 denotes an interface. A CPU 26 executes the processing of a control procedure (Steps S24 to S28) shown in FIG. 5. A rewritable memory 27 stores the characteristic pattern of speech sent via the public line.

An A/D converter 28 subjects a speech signal sent from the receiver 13 to A/D conversion. Reference numeral 29 denotes an interface, while numeral 30 denotes a memory for storing the speech signal subjected to digital conversion.

A CPU 31 executes the recognition processing (Steps S30 to S34 in FIG. 5) of the speech stored in the memory 30, on the basis of the characteristic pattern of speech stored in the memory 27 of the card data storage section 21.

An interface 32 transfers to the information processor 23 the control signal sent from the CPU 31.

Referring now to the flowcharts shown in FIGS. 4 and 5, a description will be given of the operation of this embodiment thus configured.

Figure 4:
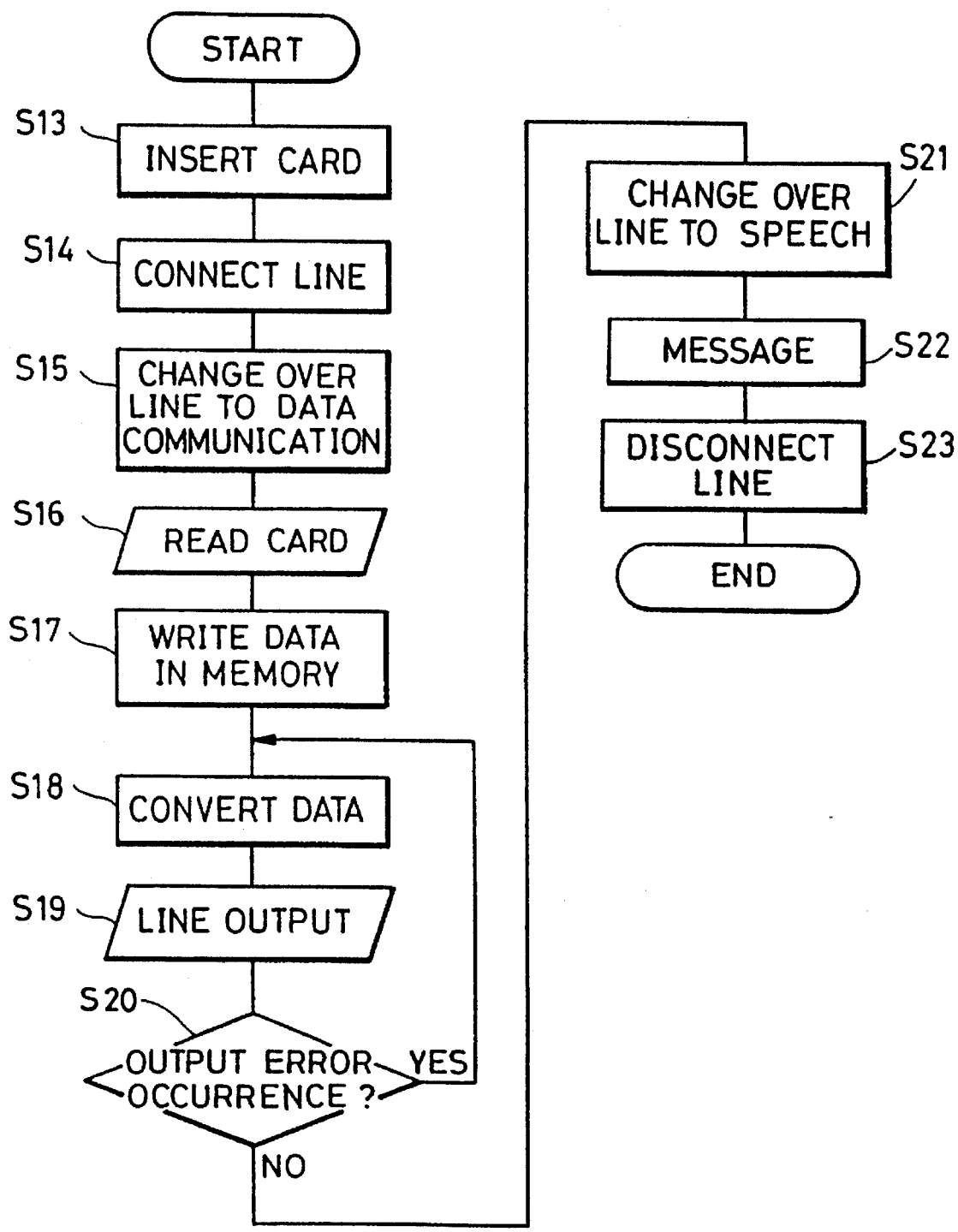
FIGS. 4 and 5 are flowcharts illustrating examples of operation in accordance with the embodiment of the present invention.

FIG. 4 shows an example of a processing procedure on the transmission side.

In FIG. 4, the user of the apparatus inserts a card into the card reader 11. The user then dials the telephone number of the receiving end using the receiver 13, and connects the transmission side and the reception side (Steps S13 to S14). When the control section 12 confirms the connection of a public line to the receiving end, the control section 12 sends a signal representing an instruction for changeover to the changeover section 14 so as to connect the public line and the control section 12 (Step S15).

Subsequently, the control section 12 instructs the card reader 11 to read the characteristic pattern of speech from the card. The card reader 11 then transmits to the control section 12 the characteristic pattern of speech read from the card (Step S16).

In the control section 12, upon receiving this characteristic pattern of speech, the CPU 16 stores the characteristic pattern of speech in the memory 17 (Step S17). The CPU 16 then codifies data concerning the characteristic pattern of speech stored in the memory 17 in accordance with a communication code system for transfer to a public line, and outputs the data to the public line by means of the modem 19 (Step S19).

If the CPU 16 receives a control signal confirming the reception of information transmitted from the reception side (from the side of the block diagram shown in FIG. 3), and detects the occurrence of an error in the communication of the characteristic pattern of speech, the operation returns to Step S18, and retransmits the characteristic pattern of speech stored in the memory 17.

When the CPU confirms that the transmission of the characteristic pattern of speech has been completed properly (Step S20), the CPU 16 instructs the changeover section 14 to change over the connection of the public line to the receiver 13, and the connection of the public line is thereby changed over by the changeover section 14 (Step S21).

Subsequently, when the operator has transmitted a necessary spoken message to the reception side by using the receiver 13, the CPU 16 disconnects the public line and completes this control procedure (Steps S22 and S23).

Figure 5:
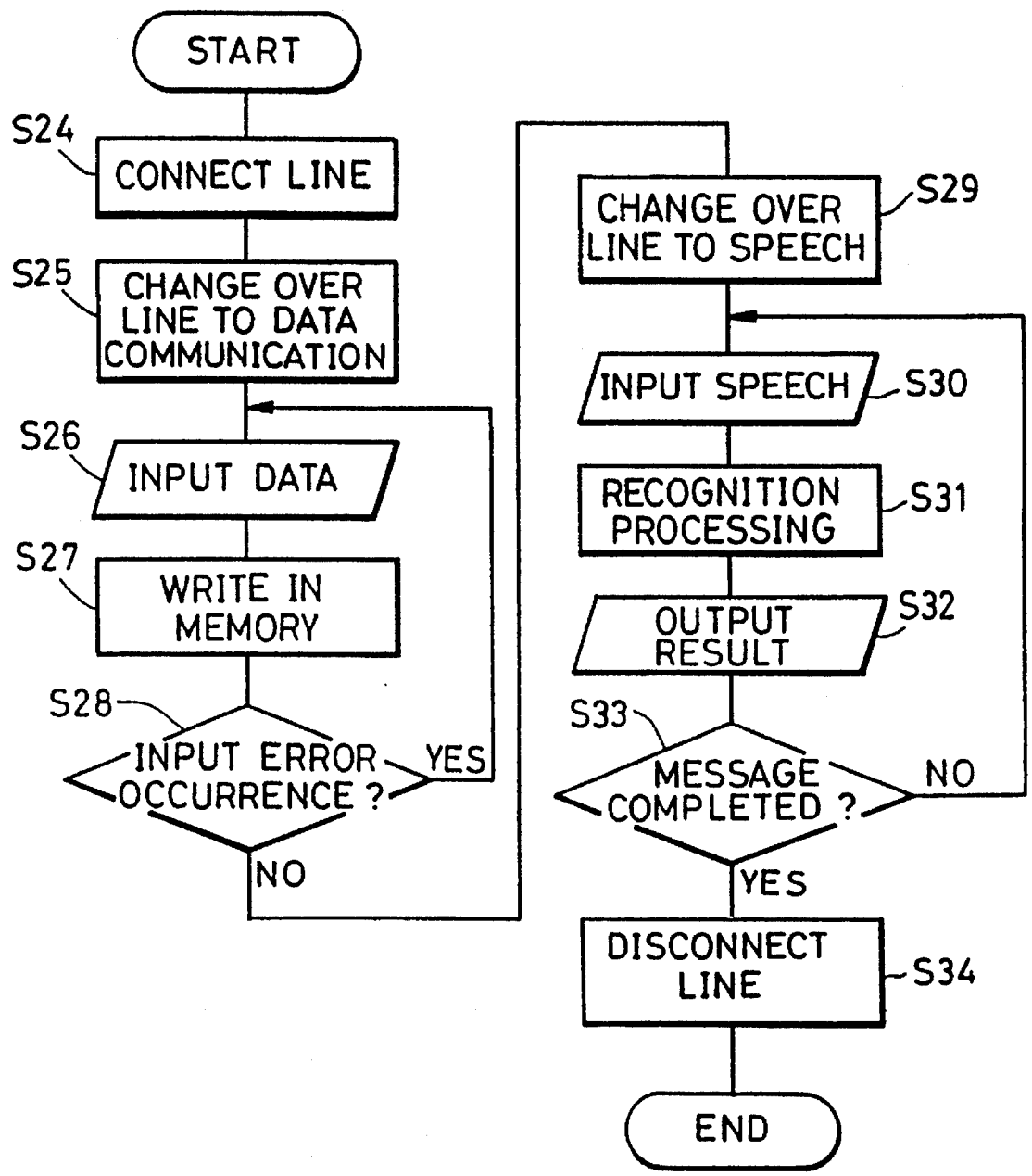

Referring now to FIG. 5, a description will be given of the information processing on the reception side (the side of the block diagram shown in FIG. 3).

In FIG. 5, when a connection is made to the public line on the reception side (Step S24), the speech recognition section 22 instructs the changeover section 20 to connect the public line and the card data storage section 21 (Step S25).

The characteristic pattern of speech sent from the transmission side (the side of the block diagram shown in FIG. 2) is then stored in the memory 27 under the control of the CPU 26 disposed in the data storage section 21 (Step S27).

The CPU 26 confirms the coded form of the input information through a parity check or the like, and if an abnormality occurs in the input information, the CPU 26 delivers error information to the transmission side and performs again the process for reception of information, restarting with Step S26.

If input information is proper, the CPU 26 hands over the control to the CPU 31 of the speech recognition section 22 (Step S28).

The CPU 31 instructs the changeover section 20 to connect the public line to the speech recognition section 22, and receives a speaker's message sent from the transmission side (Steps S29 and S30).

This message is stored in the memory 30 by the CPU 31. Until the reception of the aforementioned message is completed, the CPU 31 identifies what the speaker's message is, on the basis of the characteristic pattern of speech stored in the memory 27, and instructs the information processor 23 to perform information processing corresponding to the recognized result, for instance, operation or stopping of the apparatus (Steps S31 to S33). Upon completion of a call to the transmission side, the CPU 31 disconnects the public line, thereby completing this control procedure.

Thus, on the reception side (on the side of the block diagram shown in FIG. 3), the characteristic pattern of speech sent first from the transmission side (the side of the block diagram shown in FIG. 2) is stored in the rewritable memory 27, and the contents of the message sent by the speaker are then identified on the basis of the characteristic pattern of speech stored in the memory 27. Therefore, even in cases where communication is attempted from a large, unspecified number of transmission sources, there is no need to register in advance the respective patterns of the speakers' speech in the reception-side memory.

To illustrate a form of usage of this embodiment, the user of a card inputs in advance the sounds of the numbers "1" to "10" through a microphone or the like as the characteristic pattern of speech to be used in identifying him, and the input speech data is written in advance in a magnetic recording card or an optical recording card. In this embodiment, when the speaker sends to the receiving side a message consisting of an appropriate number of the numerals "1" to "10" in a suitable combination, it is determined which of the numbers "1" to "10" corresponds to the sound generated by the speaker. Although numerals have been given as an example of the characteristic pattern of speech, the characteristic pattern of speech is not confined to numerals, and a password may also be used.

Accordingly, on the reception side, it is also possible to confirm whether the speech of the speaker using the card agrees with the speech registered in the card, which makes it possible to prevent abuse of the card. The success rate in preventing abuse in this system is far greater than that in a system in which the identity of the holder of the card and the user of the system is confirmed as being the same by inputting a keyword or the like using a keyboard.

As for the method of recognizing speech, a dynamic programming (DP) matching method is known in which analysis of the frequency of speech is carried out and a comparison is made between the characteristic pattern of speech and the result of analysis of the frequency. In addition, an arithmetic processing circuit in which the processing for performing this comparison is done in an LSI (large-scale integrated circuit) is known, so that the reception side's apparatus can be made compact if this LSI is used.

Furthermore, as for the characteristic parameters used in the characteristic pattern of speech, it is conceivable to employ the pitch of the speech, the time transition of a frequency spectrum for each fixed period, and the transition of the position of a format, but a parameter which is most required in the recognition should be extracted in accordance with the object to be recognized by the speech recognition section 22 (e.g., recognition in units of restricted words, and recognition in units of monophthongs).

As has been described above, in accordance with the present invention, the characteristic pattern of speech is registered in advance in a card, the characteristic pattern of speech registered in the card is sent to a speech recognition apparatus prior to speech recognition through the telephone, and the speaker's identity is recognized by using that characteristic pattern of speech. This provides the advantage that it is possible to more positively recognize the speech of a large, unspecified number of speakers. Furthermore, since it is unnecessary to store in advance the characteristic pattern of speech on the reception side, the capacity of the memory in which the speech information for speech recognition is stored can be made small, so that the apparatus can be advantageously made compact. The various elements designated by boxes in FIGS. 1–3 are per se well known and no special construction of any of these elements is needed to carry out the invention according to the best mode contemplated by the inventor.

What is claimed is:

1. A speech information processing apparatus comprising:

speech input receiving means for receiving input speech information;

reading means for reading from a recording medium prerecorded speech information for use in recognizing said input speech information;

speech information transmission means for transmitting both the input speech information, received by said speech input receiving means, and the prerecorded speech information, read by said reading means, to a speech recognition device through a public line;

control means for controlling said reading means to read out the prerecorded speech information, and controlling said speech information transmission means to transmit the read out prerecorded speech information to the speech recognition device through the public line, said control means detecting a communication error in the communication of the prerecorded speech information to the speech recognition device through the public line and controlling said speech information transmission means to repeatedly transmit the read out prerecorded speech information when the communication error is detected while maintaining the connection to the public line, said control means confirming the proper completion of transmission of the prerecorded speech information when said speech information transmission means properly completes transmission of the prerecorded speech information;

changeover means for changing over the connection of a public line from being connected to said control means to being connected to said speech input receiving means, wherein said control means controls said changeover means so that the public line is connected to said control means when said control means determines that the prerecorded speech information is to be transmitted to the public line and when the prerecorded speech information is repeatedly transmitted over the public line and wherein the public line is connected to said speech input receiving means after said speech information transmission means transmits the read out prerecorded speech information and said control confirms proper transmission of the prerecorded speech information.

2. A speech information processing apparatus according to claim 1, further comprising codifying means for codifying prerecorded speech information read by reading means in accordance with a communication code system of the public line.

3. A speech information processing apparatus according to claim 1, wherein said control means receives a signal confirming the reception of information of said transmitted speech information, and, if the signal indicates a transmission error, said control means controls said transmission means to retransmit the speech information to the public line.

4. A speech information processing apparatus according to claim 1, wherein the recording medium is an optical card.

5. A speech information processing apparatus according to claim 1, wherein the recording medium is a magnetic card.

6. A speech information processing apparatus comprising:

storage means for receiving and storing prerecorded speech information to be used in recognizing input speech information;

speech recognition means for receiving the input speech information and effecting speech recognition of the input speech information according to the prerecorded speech information stored in said storage means;

changeover means for changing over the connection of a public line from being connected to said storage means to being connected to said speech recognition means; and controlling means for controlling said changeover means to connect the public line to said storage means when prerecorded speech information is received, said controlling means controlling said storage means to store the received prerecorded speech information, said control means confirming the form of the received prerecorded speech information, said controlling means transmitting an error signal through the public line when detecting an abnormality in the received prerecorded speech information, said controlling means repeatedly performing the storing, confirming, and transmitting operations when an abnormality is detected, said controlling means transmitting a signal confirming the completion of receipt of the prerecorded speech information when an abnormality is not detected, and said controlling means controlling said changeover means to connect the public line to said speech recognition means when said controlling means transmits the confirming signal.

7. A speech information processing apparatus according to claim 6, further comprising a confirmation means for confirming the input of the input speech information, and, for transmitting error information to a receiver if there is an error in the input of the input speech information.

8. A method of processing speech information comprising:

receiving input speech information in speech input receiving means;

reading from a recording medium prerecorded speech information and controlling the reading with control means;

connecting a public line to the control means;

transmitting the read out prerecorded speech information through a public line to a speech recognition device;

detecting a communication error in the communication of the prerecorded speech information to the speech recognition device through the public line;

repeating the transmitting of the read out prerecorded speech information through the public line to the speech recognition device when detecting a communication error in said detecting step while maintaining the connection to the public line;

confirming the proper completion of transmission of the prerecorded speech information when the proper transmission of the prerecorded speech information is completed;

changing over the connection of a public line from being connected to the control means to being connected to the speech input receiving means;

controlling said changing over step so that the public line is connected to the control means when the prerecorded speech information is to be transmitted to the public line and so that the public line is connected to the speech input receiving means after said confirming step by receiving a signal confirming completion of transmission of the prerecorded speech information; and transmitting the input speech information to a speech recognition device through the public line when the public line is connected to the speech input receiving means.

9. A method according to claim 8, further comprising the step of codifying prerecorded speech information read in said reading step in accordance with a communication code system of the public line.

10. A method according to claim 8, wherein said controlling step comprises the step of receiving a signal confirming the reception of information of the transmitted speech information, and, if the signal indicates a transmission error, said controlling step comprises the step of controlling said transmitting step to retransmit the speech information to the public line.

11. A method according to claim 8, wherein the recording medium is an optical card, and wherein said reading step comprises the step of reading the optical card.

12. A speech information processing apparatus according to claim 8, wherein the recording medium is a magnetic card, and wherein said reading step comprises the step of reading the magnetic card.

13. A method of processing speech information comprising:

receiving and storing prerecorded speech information to be used in recognizing input speech information in storage means;

receiving the input speech information and effecting speech recognition of the input speech information according to the prerecorded speech information stored in the storage means with speech recognition means;

changing over the connection of a public line from being connected to the storage means to being connected to the speech recognition means with changeover means; and controlling the changeover means to connect the public line to the storage means when prerecorded speech information is received;

confirming the form of the received prerecorded speech information;

transmitting an error signal through the public line when said confirming step detects an abnormality in the received prerecorded speech information;

repeatedly performing said receiving and storing, confirming, and transmitting steps when said confirming step detects an abnormality in the received prerecorded speech information;

transmitting a signal confirming the completion of receipt of the prerecorded speech information with control means when an abnormality is not detected in said confirming step; and controlling the changeover means to connect the public line to the speech recognition means when the control means transmits the confirming signal.

14. A method according to claim 13, further comprising the step of confirming the input of the input speech information, and, for transmitting error information to a receiver if there is an error in the input of the input speech information.

* * * * *

UNITED STATES PATENT AND TRADEMARK OFFICE
CERTIFICATE OF CORRECTION

PATENT NO. : 5,497,446
DATED : March 5, 1996
INVENTOR(S) : TAKASHI ASO

It is certified that error appears in the above-indentified patent and that said Letters Patent is hereby corrected as shown below:

<u>COLUMN 7</u>

Line 25, "control" should read --control means--.
    Line 62, "trol" should read --trolling--.

<u>COLUMN 8</u>

Line 66, "apparatus" should read --method--.

Signed and Sealed this

Sixteenth Day of July, 1996

Attest:

BRUCE LEHMAN

*Attesting Officer*    *Commissioner of Patents and Trademarks*